US008332920B2

(12) United States Patent
Kass (10) Patent No.: US 8,332,920 B2
(45) Date of Patent: Dec. 11, 2012

(54) TOKEN-BASED CLIENT TO SERVER AUTHENTICATION OF A SECONDARY COMMUNICATION CHANNEL BY WAY OF PRIMARY AUTHENTICATED COMMUNICATION CHANNELS

(75) Inventor: Eric Kass, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 424 days.

(21) Appl. No.: 12/626,022

(22) Filed: Nov. 25, 2009

(65) Prior Publication Data

US 2010/0138905 A1 Jun. 3, 2010

(30) Foreign Application Priority Data

Nov. 28, 2008 (DE) .................................... 08170167

(51) Int. Cl.
*G06F 21/00* (2006.01)
(52) U.S. Cl. ............ 726/7; 713/151; 713/171; 709/203; 709/224; 726/12
(58) Field of Classification Search .................. 726/7
See application file for complete search history.

(56) References Cited

U.S. PATENT DOCUMENTS

| | | | | |
|---|---|---|---|---|
| 6,490,679 | B1 * | 12/2002 | Tumblin et al. ............... | 713/155 |
| 7,853,983 | B2 * | 12/2010 | Abrutyn et al. ................... | 726/2 |
| 7,962,655 | B2 * | 6/2011 | Birger et al. ................... | 709/250 |
| 7,992,198 | B2 * | 8/2011 | Guarraci et al. ................... | 726/9 |
| 2004/0255121 | A1 | 12/2004 | Eckert et al. | |
| 2006/0184681 | A1 * | 8/2006 | Bernardi et al. ............... | 709/229 |
| 2008/0127323 | A1 | 5/2008 | Soin et al. | |
| 2008/0301783 | A1 * | 12/2008 | Abrutyn et al. ................... | 726/5 |
| 2009/0006850 | A1 * | 1/2009 | Birger et al. ................... | 713/169 |
| 2010/0169414 | A1 * | 7/2010 | Pavot et al. ................... | 709/203 |
| 2010/0198842 | A1 * | 8/2010 | Giraudon et al. ............. | 707/754 |

FOREIGN PATENT DOCUMENTS

EP 1843543 A1 10/2007

OTHER PUBLICATIONS

Smart Cards and Mobile Device Authentication| http://csrc.nist.gov/publications/nistir/nist-IR-7206.pdf|Jansen et al.|Jul. 2005.*
C. Kaufman et al., Network Security, Private Communication in a Public World, Ch. 9, pp. 212-222, Ch. 11, pp. 257-290, Ch. 13, pp. 307-313, Prentice Hall PTR, 2002.
nternational Search Report and Written Opinion for PCT Application No. PCT/EP2009/064052, mailed Sep. 10, 2010.
Wobber et al., Authentication in the Taos Operating System, Operating Systems Review, ACM, NY NY Dec. 1, 1993.
International Preliminary Report on Patentability for PCT Application No. PCT/EP2009/064052 mailed Jun. 9, 2011.

* cited by examiner

*Primary Examiner* — Taghi Arani
*Assistant Examiner* — Mahfuzur Rahman
(74) *Attorney, Agent, or Firm* — Hamilton & Terrile, LLP; Stephen A. Terrile (57) ABSTRACT

The disclosure relates to authenticating a secondary communication channel between a client application and a server application when an authenticated primary communication channel has already been established between the client application and a resource application, on which the server application can store a generated authentication token that only privileged users including the client application user can read-access and send back to the server application by way of the secondary communication channel.

14 Claims, 4 Drawing Sheets

TOKEN-BASED CLIENT TO SERVER AUTHENTICATION OF A SECONDARY COMMUNICATION CHANNEL BY WAY OF PRIMARY AUTHENTICATED COMMUNICATION CHANNELS

BACKGROUND

1. Technical Field

The present invention relates to a method of authentication in a computer system, a computer system for executing the method, and a computer program product containing program code portions to execute the method.

2. Description of the Related Art

A client application needs to access resources of a server application. The client application opens a communication channel with the server application. The communication channel is usually unauthenticated, which means that any client application can establish the connection. Before the client application accesses the resources of the server application, the client application requests authentication from the server application by identifying the name of the client application user. To authenticate the client application user, the server application sends the client application a challenge, a puzzle only solvable by the actual client application user. The client application sends back the solution to the puzzle. The server application verifies the solution, thus authenticating the client application and granting access of resources of the server application to the client application.

In prior art implementations, the challenge could be a message from the server application that the client application encrypts with the key of the client application user. The message could be a nonce, which is known as a "number used once" in security engineering, and which has been generated only for one communication session. The nonce may be any random data or a timestamp. The key of the client application user is either a symmetric key in which both the client application and the server application have a copy. Or the key is an asymmetric one in which the client application has the private key and the server application the corresponding public key. The client sends back the encrypted message to the server application. The server application decrypts the message with the symmetric key or public key, respectively, of the client application user and verifies that this decrypted message matches the message that the server application has sent to the client application. When the verification is successful, the server application infers that the message has been encrypted by the owner of the symmetric or private key, respectively, of the client application user and authenticates the sender of the encrypted message.

In prior art, an alternative way of authentication is based on the encryption and the decryption of a password with asymmetric keys. The client application sends a password to the server application by way of an encrypted communication channel. The communication channel can be encrypted with the public key of the server application user, which is either publicly available or has been passed to the client application before encrypting and sending the password over the communication channel to the server application. The server application is the only one able to decrypt the received message containing the password with the server application user's private key. When the server application is running on a server application host, the server application may request authentication from the underlying operating system of the server application host using the password obtained from the client application.

In prior art, the Kerberos algorithm uses authentication of a client application by a server application over a central authentication server. Details can be found for example in C. Kaufman et al., Network Security, Prentice Hall, 2002. The Kerberos algorithm essentially works as follows: The client application sends a request to a central authentication server to return a ticket for authentication by the server application. The authentication server invents a session key and creates a ticket for the server application by encrypting the session key and the name of the client application user with the public or symmetric key of the server application user. The invented session key, the generated ticket for the server application, and the name of the server application user are all encrypted with the public or symmetric key of the client application user. The central authentication server sends the encrypted message to the client application. The client application user is the only one able to decrypt the received message with the client application user's private or symmetric key. The client application user verifies that the message received from the central authentication server can be used to authenticate the client application by the server application because only the client application user can decrypt the message and it contains the name of the server application user. The client application sends the ticket for the server application and a timestamp encrypted with the session key to the server application. The server application user is the only one able to decrypt the ticket with the server application user's private or symmetric key and retrieve the session key and the name of the client application user. The server application recognizes the name of the client application user that the central authentication server has inserted into the ticket, thus the ticket is used to authenticate the sending client application by the server application. The server application uses the session key from the decrypted ticket to decrypt the encrypted timestamp and validates it. On base of the ticket and the timestamp, the server application grants access to the client application who requested access to the server application.

The encryption of the central authentication server guarantees that only the client application user can decrypt the message from the central authentication server and only the server application user can decrypt the ticket that the central authentication server has created and the client application has sent to the server application.

In the Kerberos algorithm, the client application user authenticates itself with the server application without knowing a password or a key of the server application user. Vice versa, the server application does not have the need to store any key or password of the client application user. The central authentication server, however, must store the public or symmetric keys of both the client application user and the server application user.

The prior art has a disadvantage when the server application cannot access the authentication mechanism of the underlying operating system. In this case, the server application cannot use a password received from the client application to authenticate the client application user.

A second disadvantage of the prior art is the fact that the communication channel must be encrypted when transmitting any password. At least one of the client application and the server application must implement the encryption and decryption of a password or a nonce which are required for the secure exchange of data over the communication channel. The implementation of encryption and decryption program code is complex.

The Kerberos algorithm is based on a central authentication server with a ticket generation mechanism and the encryption and decryption of messages using symmetric or asymmetric keys of the client application user and the server application user. The setup and implementation of the authentication server and the program code for encryption and decryption at the client application side and server application side are also complex.

OBJECTIVES OF THE INVENTION

It is thus an objective of the present invention to provide a simplified method and system to authenticate a client application by a server application after establishing an unauthenticated and unencrypted secondary communication channel between the client application and the server application.

SUMMARY

This objective of the present invention is achieved by a method for authentication in a system having a client application, a server application, a resource location, an authenticated primary communication channel between the client application and the resource location, and an authenticated primary communication channel between the server application and the resource location. An authenticated communication channel means that the client application user who establishes the communication channel between the client application and the resource location is authenticated by the resource location. The same applies to the authenticated communication channel between the server application and the resource location where the resource location authenticates the server application user. The resource location only allows the establishment of a communication channel for a set of privileged users and knows the identity of the user who created the communication channel with the resource location. The primary communication channels do not have to be necessarily encrypted, which means that an intruding application can eavesdrop on the communication channels and read the transmitted messages.

To establish a secondary and direct communication channel connection between the client application and the server application, the client application creates a secondary communication channel with the server application, which is usually not authenticated and not encrypted. Any client application can create the communication channel with the server application. The server application does not know the identity of the client application user who established the communication channel connection. The client application submits a request to the server application for granting access by way of the secondary communication channel and tells the server application the identity of the client application user. The server application authenticates the client application user in the following way: The server application initiates the generation of an authentication token. The server application can create the authentication token itself or request a remote server to generate the authentication token. The authentication token can be a nonce, a number or word used once, for example, a statistically random bit pattern or an encrypted timestamp. The server application initiates to store the authentication token at the resource location and to set the access permissions so that the client application user has the right to access the authentication token. When the server application stores the generated authentication token at the resource location, the server application user has the write and create permission to access the resource location, store the authentication token at the resource location, and set the access permissions so that only a privileged user including the client application user is allowed to access the authentication token by way of the authenticated primary communication channel between the client application and the resource location. The client application must have at least the permission to read the authentication token. A non-privileged user who requests access to the server application must not have the right to access, and thereby read or modify, the authentication token. The server application user and possibly the system administrator are usually privileged users and have the permission to access the authentication token. The client application retrieves a copy of the authentication token by way of the authenticated primary communication channel between the client application and the resource location. The client application returns the copy of the authentication token to the server application by way of the secondary communication channel. The server application checks that the copy of the authentication token returned by the client application matches the generated authentication token stored at the resource location upon initiation of the server application. When the server application proves that the received copy of the authentication token and the stored authentication token are identical, the server application authenticates the client application, returns a success message to the client application by way of the secondary communication channel, and grants access to the client application. When the received copy of the authentication token is different from the stored authentication token, the server application returns an error message by way of the secondary communication channel and denies access to the client application.

In one preferred embodiment of the present invention, the client application has established the secondary communication channel with the server application before the generated authentication token is stored at the resource location. The secondary communication channel is the only communication channel by way of which the server application expects to receive the authentication token from the client application. This means that the primary communication channel does not have to be necessarily encrypted. When an intruding client application eavesdropped on any of the primary authenticated communication channels, read the authentication token, and established another secondary communication channel with the server application, the server application would deny access to the intruding client application because the secondary communication channel with the requesting client application has already been created.

The client application is running in a client device and the server application in a server device. The resource location is in one of the client device, the server device, and a third device.

In the preferred embodiment of the present invention, the client device and the server device are separate host systems with separate file systems each and the resource location is the local file system of the server application host. The client application host mounts the file system of the server application host as a remote file system and uses the authentication mechanism of the mounting of the remote file system provided by operating system services to access files of the remote file system. The server application uses operating system services of the local file system which inherently authenticate the server application user to grant access to files of the local file system.

In the preferred embodiment of the present invention, the client application is the client component of a database driver and the server application is the server component of the database driver.

In an alternative embodiment of the present invention, the client application and the server application are running in the same device. This means, that they may be executed in the same host system with one local file system. The client application sends a request to the server application for granting access. The request includes the name of the client application user, but not the password. The server application is not able to use the password of the client application user because the server application cannot access the authentication mechanism of the underlying operating system. The server application stores the generated authentication token at a location of the common file system, where the client application can easily read the authentication token. The client application sends a copy of the authentication token to the server application. The server application verifies the authentication token and grants access to the client application.

In a second alternative embodiment of the present invention, the resource location is a file system of a file server host, which is separate from both the client application host and the server application host. The client application host and the server application host mount the file system of the file server host as remote file systems each and use the authentication mechanism provided by operating system services to access the files of the remote file system.

In a third alternative embodiment of the present invention, the resource location may be an authentication server or a database server.

In a forth alternative embodiment of the present invention, at least one of the primary communication channels between the client application and the resource location and between the server application and the resource location uses an authenticated network communication protocol. The network communication protocol may be secure socket layer (SSL) and the authentication token stored at the resource location may be identified by a uniform resource locator (URL).

In a fifth alternative embodiment of the present invention, the server application initiates to store the generated authentication token at the resource location before the client application has created the secondary communication channel with the server application. The client application user can access and read the authentication token, create a secondary communication channel with the server application, send a copy of the authentication token to the server application, and the server application finally authenticates the client application. In this case, however, the primary communication channels must be encrypted. When the primary communication channels were not encrypted, an intruding client application could eavesdrop on any of the primary communication channels, create a secondary communication channel with the server application, pretend to be the client application user the authentication token was generated for, misuse and send the stolen copy of the authentication token to the server application, and get access granted to the server application.

In a sixth alternative embodiment of the present invention, the client application is replaced with the server application and vice versa. The primary communication channel between the client application and the resource location is replaced with the primary communication channel between the server application and the resource location and vice versa. After this exchange of roles between the client application and the server application, the described authentication method can be applied in a corresponding way.

In a seventh alternative embodiment of the present invention, at least one of the client application and the server application are running in a smart card device.

The method of the present invention can be performed in a computer system and implemented in a computer program product for execution in a data processing system comprising computer program code portions for performing the steps of the method.

BRIEF DESCRIPTION OF THE DRAWINGS

The present invention is illustrated by way of example and is not limited by the shape of the figures of the drawings in which.

DETAILED DESCRIPTION

In the drawings and specification there has been set forth a preferred embodiment of the invention and, although specific terms are used, the description thus given uses terminology in a generic and descriptive sense only and not for purposes of limitation. It will, however, be evident that various modifications and changes may be made thereto without departing from the broader spirit and scope of the invention as set forth in the appended claims.

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when being loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Figure 1:
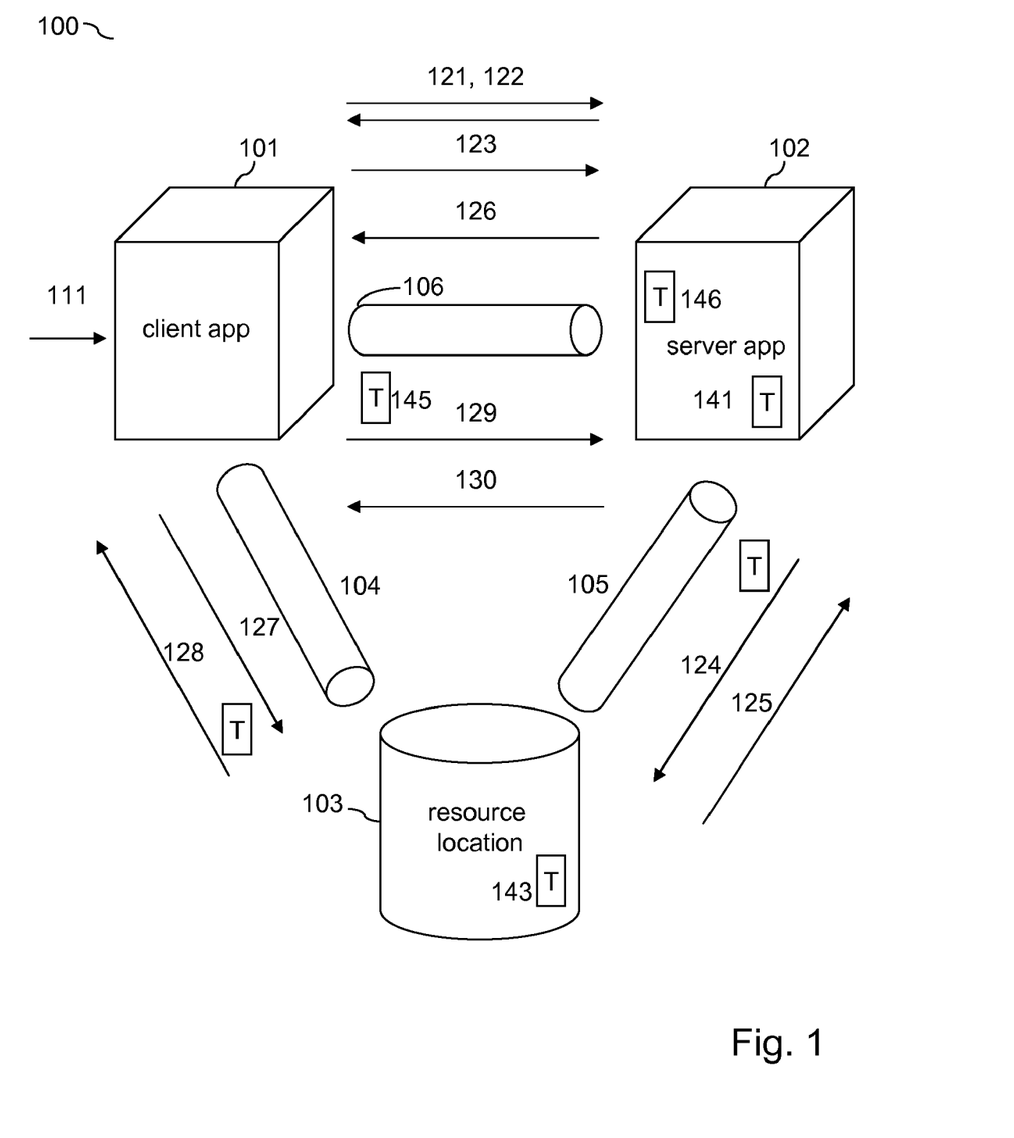
FIG. 1 is a schematic block diagram representation of a token-based authentication system according to the present invention.

FIG. 1 shows a system for authentication, which comprises a client application (101), a server application (102), and a resource location (103). The client application (101) and the server application (102) access the resource location (103) by way of authenticated primary communication channels (104) and (105), respectively.

The primary communication channels (104) and (105) are not necessarily encrypted, that is, a third party could read data transmitted over the channels (104) and (105). The communication channel (104) provides a path for the client application to access access-controlled resources of the resource location (103), for example, files with controlled access in a remote file system.

The client application (101) runs in an authenticated logon session on behalf of the client application user who logged on (111) to the client application by entering a user name and password.

The server application (102) runs in an authenticated logon session on behalf of the server application user established by operating system services.

The client application (101) intends to establish a secondary communication channel (106) with the server application (102). The secondary communication channel (106) may be a communication socket between the client and server components of a database driver connecting a client application to a database server. The server component of the database driver may not be able to access the authentication mechanism of the underlying operating system of the database server and use a received password of the client application user for authentication. Therefore, the client application (101) creates (121, 122) a secondary unauthenticated secondary communication channel (106) with the server application (102), which means that the communication channel does not require user credentials, any client application could establish the connection. The communication channel (106) is not necessarily encrypted.

The client application (101) sends a request (123) to the server application (102) to authenticate the client application running on behalf of the client application user through the established unauthenticated secondary communication channel (106). The request contains the name of client application user.

The server application (102) generates an authentication token (141), which may be a statistically random bit pattern or an encrypted timestamp. The confidence of the identity validation is determined by the quality of the random generator of the authentication token (141). The server application "drops it off", that is, stores (124, 125) the authentication token (143) at the resource location (103) with a certain name and location. The server application sets the file access permissions of the authentication token (143) so that only a group of privileged users including the client application user is permitted to read the authentication token. The name of the client application user was included in the request (123) for authentication of a secondary communication channel with the server application. Non-privileged users, however, must not be allowed to access the authentication token. The server application user and usually the system administrator belong to the group of privileged users with the right to access the authentication token (143).

The server application (102) returns (126) a response to the client application (101) by way of the secondary communication channel (106), which may include the name and location of the authentication token (143) stored at the resource location (103).

The client application (101) "recovers", that is, reads (127, 128) the authentication token from the resource location (103) by way of the authenticated primary communication channel (104). The client application user who requested the secondary communication channel (106) with the server application (102) or any application user with the credentials of the client application user is one of the privileged users who is allowed to access and read the authentication token (143). The client application (101) returns (129) a copy (145) of the authentication token (143) to the server application (102) by way of the secondary communication channel (106).

The server application (102) receives the copy (146) of the authentication token (143) through the expected secondary communication channel (106). This is the only communication channel by means of which the server application (102) expects to receive the copy (146) of the authentication token (143) in response to the request (123) to authenticate the client application user.

The server application verifies (102) that the received ("recovered") copy (146) of the authentication token (143) matches the authentication token (143) which the server application has stored ("dropped off") at the resource location (103) and only the client application user could access. The stored authentication token (143) is identical with the generated authentication token (141).

If the verification is successful, the user who established the unauthenticated secondary communication channel (106) with the server application (102) is the user who he claims to be. The server application (102) authenticates the secondary communication channel (106) with the client application and grants access to the client application (101). The server application may return (130) a confirmation message to the client application by way of the secondary communication channel (106) that the client application user has been authenticated.

In the case of a verification failure, that is, when the copy (146) of the authentication token is different from the stored authentication token (143) or from the generated authentication token (141), the server application denies access and returns (130) an application error to the client application over the secondary communication channel (106).

If at least one of the primary communication channel (104) between the client application (101) and the resource location (103) and the primary communication channel between the server application (102) and the resource location (103) are not encrypted, it is important that the unauthenticated secondary communication channel (106) with the server application (102) is established BEFORE the server application stores the authentication token at the resource location (103). The server application (102) expects the authentication token only by way of the established secondary communication channel (106).

Figure 2:
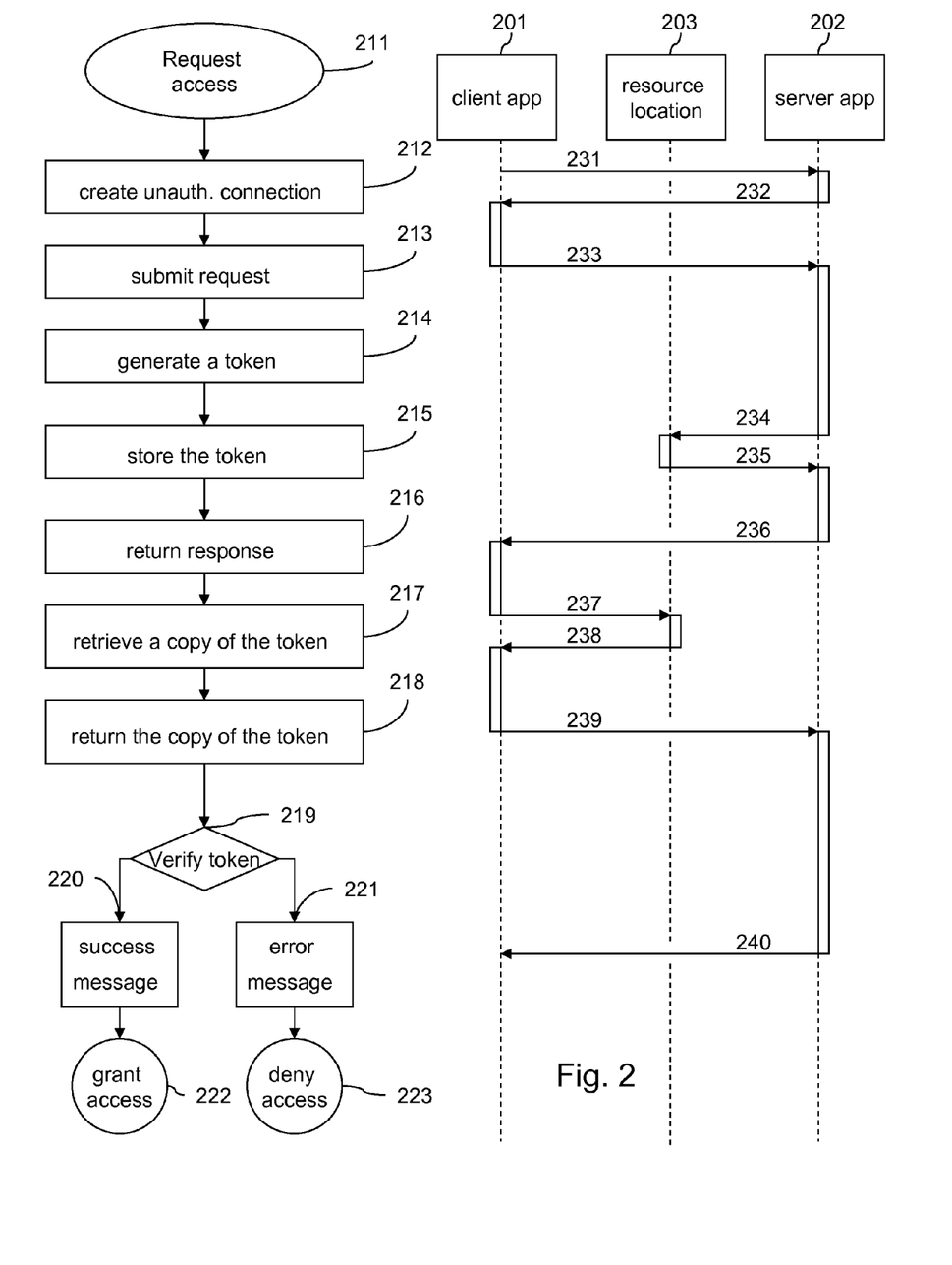
FIGS. 2, 3, and 4 are flow charts and process diagram representations of the authentication token-based authentication method according to the present invention.

FIG. 2 contains the flow and process chart of the authentication method of the present invention. In response to a request (211) to establish a secondary communication channel (106), the client application (201) creates (212, 231, 232) an unauthenticated secondary communication channel (106) with the server application (202). The client application (201) uses this communication channel (106) to submit a request (213, 233) to the server application (202). The server application (202) generates (214) an authentication token and stores (215, 234, 235) it at the resource location (203) so that the client application user is the only one able to read it besides the server application user and possibly the system administrator. The server application (202) returns (216, 236) a response to the client application (201). Then, the client application (201) retrieves (217, 237, 238) a copy of the authentication token by way of the primary communication channel (104) between the client application (201) and the resource location (203) and returns (218, 239) it to the server application (202) using the secondary communication channel (106). The server application (202) verifies (219) that the received copy of the authentication token matches the generated authentication token that has been stored at the resource location (203) and only the client application user could read-access. If the verification is successful, the server application returns (220, 240) a success message by way of the secondary communication channel (106) and grants (222) access to the client application (201). If the verification fails, the server application (202) sends back (221, 240) an error message to the client application (201) by means of the secondary communication channel (106) and denies (223) access to the client application (201).

Figure 3:
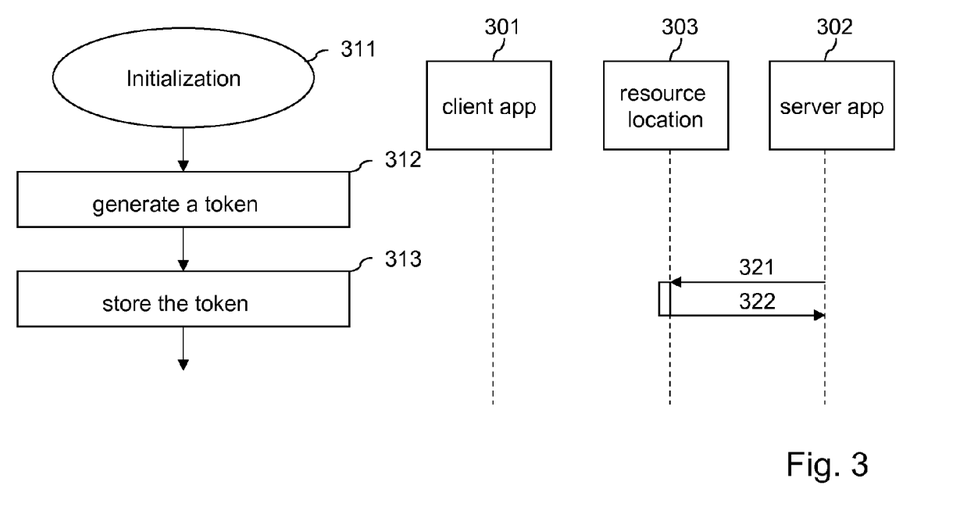

FIG. 3 shows an alternative embodiment in which the server application (302) generates (312) an authentication token upon initialization (311) and stores (313, 321, 322) it at the resource location (303) before the secondary communication channel (106) has been established between the client application (301) and the server application (302). In the alternative embodiment, there is a one-to-one relationship of the generated authentication token and the client application user who is expected to create a secondary communication channel (106) with the server application and send the copy of the authentication token to the server application.

Figure 4:
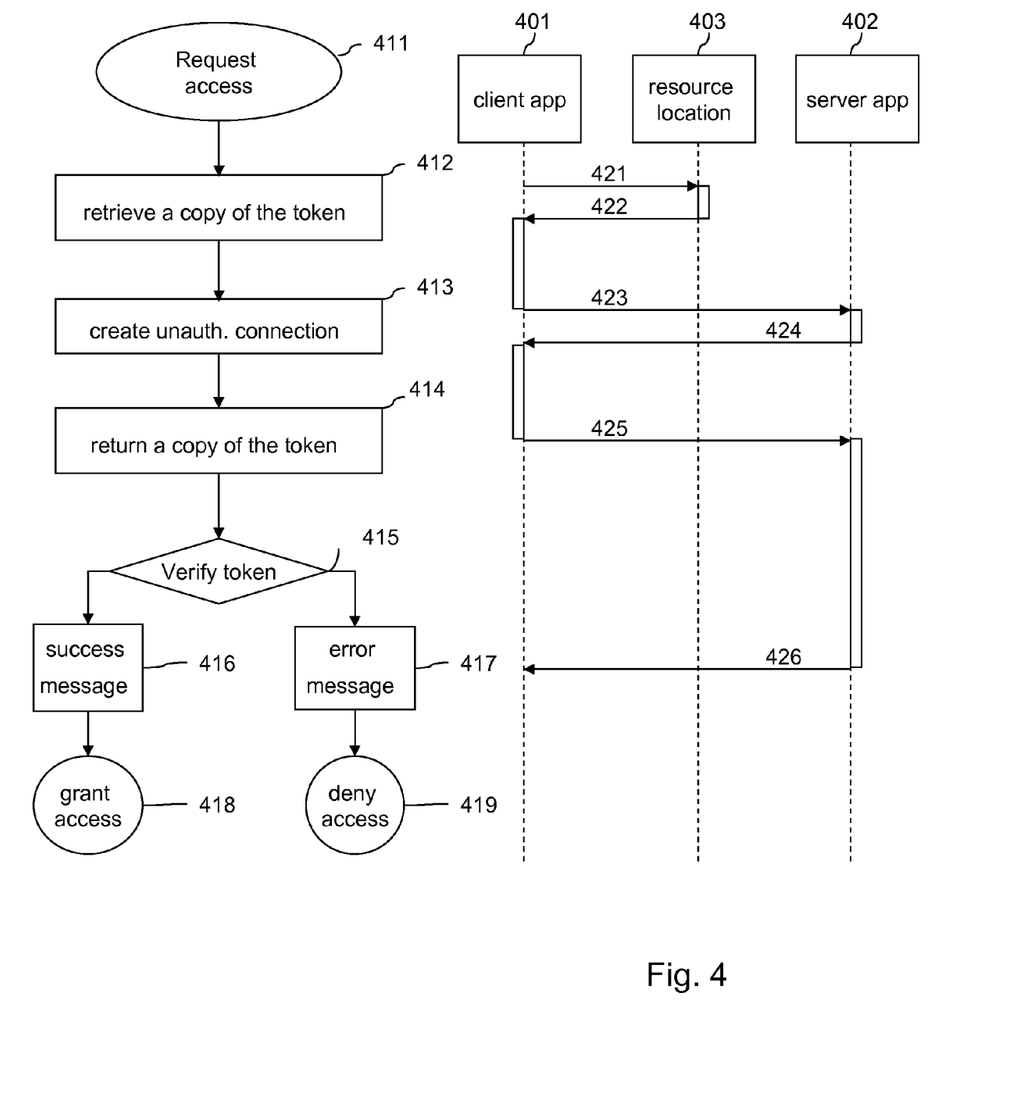

FIG. 4 shows the method steps of the alternative embodiment when the generated authentication token has been stored at the resource location (403) before the secondary communication channel has been established. In response to a request (411) to authenticate the client application running on behalf of the client application user by way of a secondary communication channel (106), the client application retrieves (412, 421, 422) a copy of the authentication token from the resource location (403). The client application user is the only privileged user to access the authentication token besides the server application user and possibly the system administration user.

The client application creates (413, 423, 424) an unauthenticated secondary communication channel (106) with the server application and returns (414,425) a copy of the authentication token to the server application by way of the secondary communication channel (106). The server application verifies (415) that the received copy of the authentication token matches the authentication token that the server application has stored for the particular client application user. Depending on the result of the verification, the server application sends (426) a success message (416) or an error message (417), and grants (418) or denies (419) access to the client application, respectively.

If at least one of the primary communication channel (104) between the client application (101) and the resource location (103) and the primary communication channel (105) between the server application (102) and the resource location (103) were not encrypted, a third party could read the copy of the authentication token from the communication channel, establish an unauthenticated secondary communication channel with the server application, and claim to be the client application user for which the authentication token was created. To avoid misuse of the authentication token in the case when the authentication token is stored at the resource location before the secondary communication channel (106) has been established, the primary communication channel (104) between the client application (101) and the resource location (103), and the primary communication channel (105) between the server application (102) and the resource location (103) must be encrypted.

When the authentication token is transmitted over the secondary communication channel (106) between the client application (101) and the server application (102) the first time, the server application will usually receive the copy of the authentication token before an intruding client application can eavesdrop on the secondary communication channel (106) and read the copy of the authentication token. In this case, the secondary communication channel does not have to be necessarily encrypted. When any copy of the authentication token is transmitted over at least one communication channel at least multiple times, even if multiple communication channels are used in sequence, it is mandatory to encrypt the corresponding communication channels.

The client application (101) can verify the identity of the server application user in exactly the same manner as the client application user authenticates with the server application, just by swapping the roles of the client application (101) with the server application (102) and the primary communication channel (104) between the client application (101) and the resource location (103) with the primary communication channel (105) between the server application (102) and the resource location (103). In this reverse authentication case, the server application establishes an unauthenticated secondary communication channel (106) with the client application, submits a request to the client application for granting access. The client application initiates to generate an authentication token and to store it at the resource location, the authentication token being read accessible to the user of the server application who requested granting access. The server application retrieves a copy of the authentication token from the resource location by way of the authenticated primary communication channel (105) and returns the copy of the authentication token to the client application by way of the secondary communication channel (106). The client application verifies that the copy of the authentication token returned by the server application matches the authentication token stored by the client application at the resource location (103).

What is claimed:

1. A method for authentication in a system having a client application, a server application, a resource location, an authenticated primary communication channel between the client application and the resource location, and an authenticated primary communication channel between the server application and the resource location, the method comprising:
    creating a secondary communication channel with the server application,
    submitting a request to the server application for granting access by way of the secondary communication channel,
    granting access to the client application by way of the secondary communication channel when the authentication has been successful,
    initiating generation of an authentication token to be stored at the resource location, the authentication token being accessible to the client application by way of the authenticated primary communication channel between the client application and the resource location,
    retrieving the authentication token from the resource location by way of the authenticated primary communication channel between the client application and the resource location,
    returning the authentication token to the server application by way of the secondary communication channel,
    authenticating the client application by checking that the authentication token returned by the client application to the server application matches the generated authentication token stored at the resource location upon initiation of the server application, and wherein
    the secondary communication channel has been established before the generated authentication token is stored at the resource location;
    the resource location is a file system; and,
    at least one of the authenticated primary communication channel between the client application and the resource location and the authenticated primary communication channel between the server application and the resource location uses an authentication mechanism provided by the operating system services of the file system.

2. The method according to claim 1, wherein the authentication token is only accessible to privileged users including the client application who requested access to the server application.

3. The method according to claim 1, wherein the authentication token stored at the resource location has been generated for a single establishment of the secondary communication channel between the client application and the server application.

4. The method according to claim 1, wherein the generated authentication token is a statistically random bit pattern.

5. The method according to claim 1, wherein the file system is a local file system of at least one of the server application and the client application.

6. The method according to claim 1, wherein the file system is a remote file system for at least one of the client application and the server application, and at least one of the authenticated primary communication channel between the client application and the resource location and the authenticated primary communication channel between the server application and the resource location, respectively, use the mounting of the remote file system for connection and authentication of at least one of the client application and the server application, respectively.

7. The method according to claim 1, wherein at least one of the authenticated primary communication channel between the client application and the resource location and the authenticated primary communication channel between the server application and the resource location uses an authenticated network communication protocol.

8. The method according to claim 7, wherein the network communication protocol is secure socket layer (SSL) and the authentication token stored at the resource location is identified by a uniform resource locator (URL).

9. The method according to claim 1, wherein the authenticated primary communication channel between the client application and the resource location and the authenticated primary communication channel between the server application and the resource location are encrypted, and the generated authentication token is stored at the resource location before the client application creates the secondary communication channel with the server application.

10. The method according to claim 1, wherein the client application is the client component of a database driver and the server application is the server component of the database driver.

11. The method according to claim 1, wherein the client application is replaced by the server application and vice versa; and the authenticated primary communication channel between the client application and the resource location is replaced with the authenticated primary communication channel between the server application and the resource location and vice versa.

12. A system for authentication having a client device running a client application, a server device running a server application, a resource location, an authenticated primary communication channel between the client device and the resource location and an authenticated primary communication channel between the server device and the resource location, the system comprising a non-transitory computer usable medium embodying computer program code, the computer program code comprising instructions executable by a processor and configured for:
  creating a secondary communication channel with the server application,
  submitting a request to the server application for granting access by way of the secondary communication channel,
  granting access to the client application by way of the secondary communication channel when the authentication has been successful,
  initiating generation of an authentication token to be stored at the resource location, the authentication token being accessible to the client application by way of the authenticated primary communication channel between the client application and the resource location,
  retrieving the authentication token from the resource location by way of the authenticated primary communication channel between the client application and the resource location,
  returning the authentication token to the server application by way of the secondary communication channel,
  authenticating the client application by checking that the authentication token returned by the client application to the server application matches the generated authentication token stored at the resource location upon initiation of the server application; and wherein
  the secondary communication channel has been established before the generated authentication token is stored at the resource location;
  the resource location is a file system; and,
  at least one of the authenticated primary communication channel between the client application and the resource location and the authenticated primary communication channel between the server application and the resource location uses an authentication mechanism provided by the operating system services of the file system.

13. The system according to claim 12, wherein the client application and the server application are running in the same device.

14. The system according to claim 12, wherein at least one of the server device and the client device further comprises the resource location.

* * * * *